(12) United States Patent
Tzao et al.

(10) Patent No.: US 8,751,144 B2
(45) Date of Patent: Jun. 10, 2014

(54) AUTOMATIC NAVIGATION METHOD AND AUTOMATIC NAVIGATION SYSTEM

(75) Inventors: Szu-Han Tzao, Taipei (TW); Jong-Jeng Hong, Kaohsiung County (TW); Shang-Yuan Cheng, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 529 days.

(21) Appl. No.: 13/085,237

(22) Filed: Apr. 12, 2011

(65) Prior Publication Data
US 2012/0116674 A1    May 10, 2012

(30) Foreign Application Priority Data
Nov. 8, 2010    (TW) ................................ 99138405 A (51) Int. Cl.
*G01C 21/00* (2006.01)
*G01C 21/20* (2006.01)
*G01C 21/26* (2006.01)
*G01C 21/34* (2006.01)
*G01C 21/36* (2006.01)

(52) U.S. Cl.
CPC .............. *G01C 21/20* (2013.01); *G01C 21/206* (2013.01); *G01C 21/26* (2013.01); *G01C 21/00* (2013.01); *G01C 21/34* (2013.01); *G01C 21/3626* (2013.01)
USPC ........... 701/400; 701/532; 701/526; 701/433; 701/408; 701/430; 342/357.34

(58) Field of Classification Search
CPC ...... G01C 21/20; G01C 21/206; G01C 21/26; G01C 21/00; G01C 21/34; G01C 21/3626
USPC ............ 701/201, 2, 532, 466, 526, 433, 430, 701/400, 408; 709/201; 244/17.13; 324/244; 342/357.34
See application file for complete search history.

(56) References Cited

U.S. PATENT DOCUMENTS

| | | | |
|---|---|---|---|
| 6,671,618 B2 * | 12/2003 | Hoisko | 701/466 |
| 7,118,555 B2 | 10/2006 | Leonard et al. | |
| 7,539,576 B2 | 5/2009 | Ohnishi et al. | |
| 2002/0010734 A1 * | 1/2002 | Ebersole et al. | 709/201 |
| 2002/0111737 A1 * | 8/2002 | Hoisko | 701/209 |
| 2005/0054938 A1 | 3/2005 | Wehman et al. | |
| 2006/0129308 A1 * | 6/2006 | Kates | 701/200 |
| 2007/0106457 A1 | 5/2007 | Rosenberg | |
| 2007/0270196 A1 | 11/2007 | Wu | |
| 2008/0120029 A1 | 5/2008 | Zelek et al. | |
| 2009/0073112 A1 | 3/2009 | Basson et al. | |
| 2009/0280860 A1 | 11/2009 | Dahlke | |
| 2011/0301784 A1 * | 12/2011 | Oakley et al. | 701/2 |

FOREIGN PATENT DOCUMENTS

| | | |
|---|---|---|
| CN | 1921913 A | 2/2007 |
| CN | 101076841 A | 11/2007 |

(Continued)

*Primary Examiner* — Behrang Badii
(74) *Attorney, Agent, or Firm* — Muncy, Geissler, Olds & Lowe, P.C.

(57) ABSTRACT

An automatic navigation method and automatic navigation system are provided. The automatic navigation method includes the following steps. A guiding path is provided. A current facing direction which a user faces is obtained by an electronic compass. A turning direction is obtained according to the current facing direction and the guiding path. The turning direction is notified by an electric shock signal. A nearest trace point of the guiding path is obtained by sensing a radio-frequency identification (RFID) tag. The turning direction is updated according to the nearest trace point and the current facing direction.

15 Claims, 7 Drawing Sheets

(56) References Cited

FOREIGN PATENT DOCUMENTS

| CN | 101303233 A | 11/2008 |
|---|---|---|
| CN | 101701828 A | 5/2010 |
| TW | 201272 | 3/1993 |
| TW | 403668 | 9/2000 |
| TW | 200622195 A | 7/2006 |
| TW | I263488 | 10/2006 |
| TW | 201033587 A1 | 9/2010 |

* cited by examiner

AUTOMATIC NAVIGATION METHOD AND AUTOMATIC NAVIGATION SYSTEM

This application claims the benefit of Taiwan application Serial No. 099138405, filed Nov. 8, 2010, the subject matter of which is incorporated herein by reference.

BACKGROUND

1. Technical Field

The disclosure relates in general to an automatic navigation method and an automatic navigation system, and more particularly to an automatic navigation method and an automatic navigation system using a radio-frequency identification (RFID) tag.

2. Description of the Related Art

Along with the advance in technology, a positioning and navigating device is provided. Normally, the positioning and navigating device obtains the user's current latitude and longitude coordinates according to the global positioning system (GPS) information received from some satellites. The navigation is performed according to the latitude and longitude coordinates and the map information.

In addition to the above positioning method and navigation method, various positioning methods and navigation methods are provided to fit the users' needs.

SUMMARY

The disclosure is directed to an automatic navigation method and an automatic navigation system, which perform positioning with an RFID tag and perform guidance with an electric shock signal.

According to a first aspect of the present disclosure, an automatic navigation method is provided. The automatic navigation method includes the following steps. A guiding path is provided. A current facing direction which a user faces is obtained by an electronic compass. A turning direction is obtained according to the current facing direction and the guiding path. The turning direction is notified with an electric shock signal. A nearest trace point of the guiding path is obtained by sensing a radio-frequency identification (RFID) tag. The turning direction is updated according to the nearest trace point and the current facing direction.

According to a second aspect of the present disclosure, an automatic navigation system is provided. The automatic navigation system includes a path planning unit, an electronic compass, a processing unit, an electric shock unit and a sensing unit. The path planning unit is used for providing a guiding path. The electronic compass is used for obtaining a current facing direction which a user faces. The processing unit obtains a turning direction according to the current facing direction and the guiding path. The electric shock unit is used for emitting an electric shock signal to notify the user of the turning direction. The sensing unit is used for obtaining a nearest trace point of the guiding path by sensing a radio-frequency identification (RFID) tag. The processing unit further updates the turning direction according to the nearest trace point and the current facing direction.

The above and other aspects of the disclosure will become better understood with regard to the following detailed description of the non-limiting embodiment(s). The following description is made with reference to the accompanying drawings.

DETAILED DESCRIPTION

First Embodiment

Figure 1:
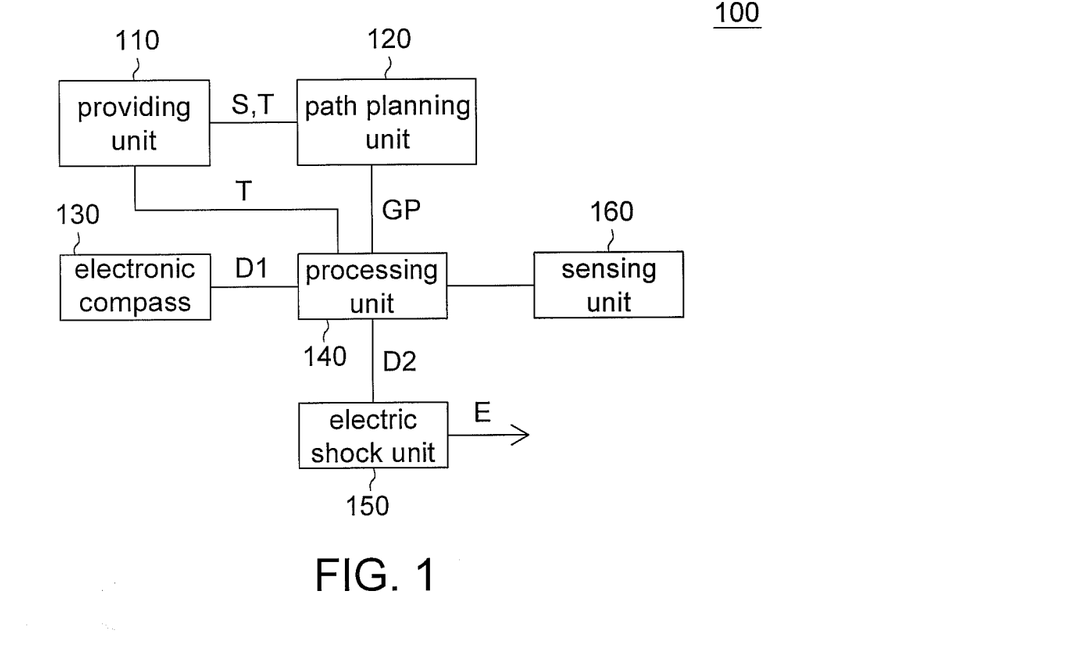
FIG. 1 is an exemplary embodiment of a block diagram of an automatic navigation system of the first embodiment.

Referring to FIG. 1, a block diagram of an automatic navigation system 100 of the first embodiment is shown. The automatic navigation system 100 includes a providing unit 110, a path planning unit 120, an electronic compass 130, a processing unit 140, an electric shock unit 150 and a sensing unit 160. The providing unit 110 is used for providing various kinds of information and can be realized by such as a hard disc, a memory used for storing data, or a connecting port (or connecting line) used for connecting the hard disc and the memory. The path planning unit 120 is used for planning the guiding path GP from an initial position S to a target position T. The electronic compass 130 is used for measuring the current facing direction D1, such as north east or south east, which the user faces. The processing unit 140 is used for performing various computation programs. The electric shock unit 150 is used for emitting an electric shock signal E. The sensing unit 160 is used for sensing a radio-frequency identification (RFID) tag RT (illustrated in FIG. 4). The path planning unit 120, the processing unit 140 and the sensing unit 160 are realized by such as a micro-processing chip, a firmware circuit or a storage medium storing several sets of programming codes.

Figure 2:
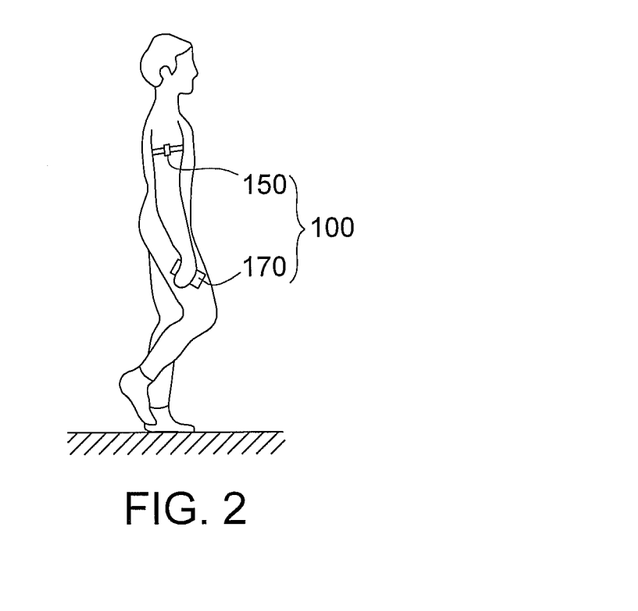
FIG. 2 is an exemplary embodiment of an automatic navigation system.

Referring to FIG. 2, an automatic navigation system 100 is shown. The providing unit 110, the path planning unit 120, the electronic compass 130, the processing unit 140 and the sensing unit 160 of the automatic navigation system 100 can be integrated in a portable electronic device 170, and the electric shock unit 150 is independently worn on a user's skin, wherein the providing unit 110, the path planning unit 120, the electronic compass 130, the processing unit 140 and the sensing unit 160 are illustrated in FIG. 1. The portable electronic device 170 and the electric shock unit 150 can transmit information wirelessly or through a cable. If the automatic navigation system 100 adopts separation type design, the electric shock unit 150 can be worn at a suitable position more easily, and the portable electronic device 170 held at hand has an input interface with which the user can input data conveniently.

In another embodiment, all the elements of the automatic navigation system 100 can be integrated in the same electronic device. Whether the automatic navigation system 100 adopts separation/integration design and what apparatus will the automatic navigation system 100 matches with are determined according to the needs of product design.

Figure 3:
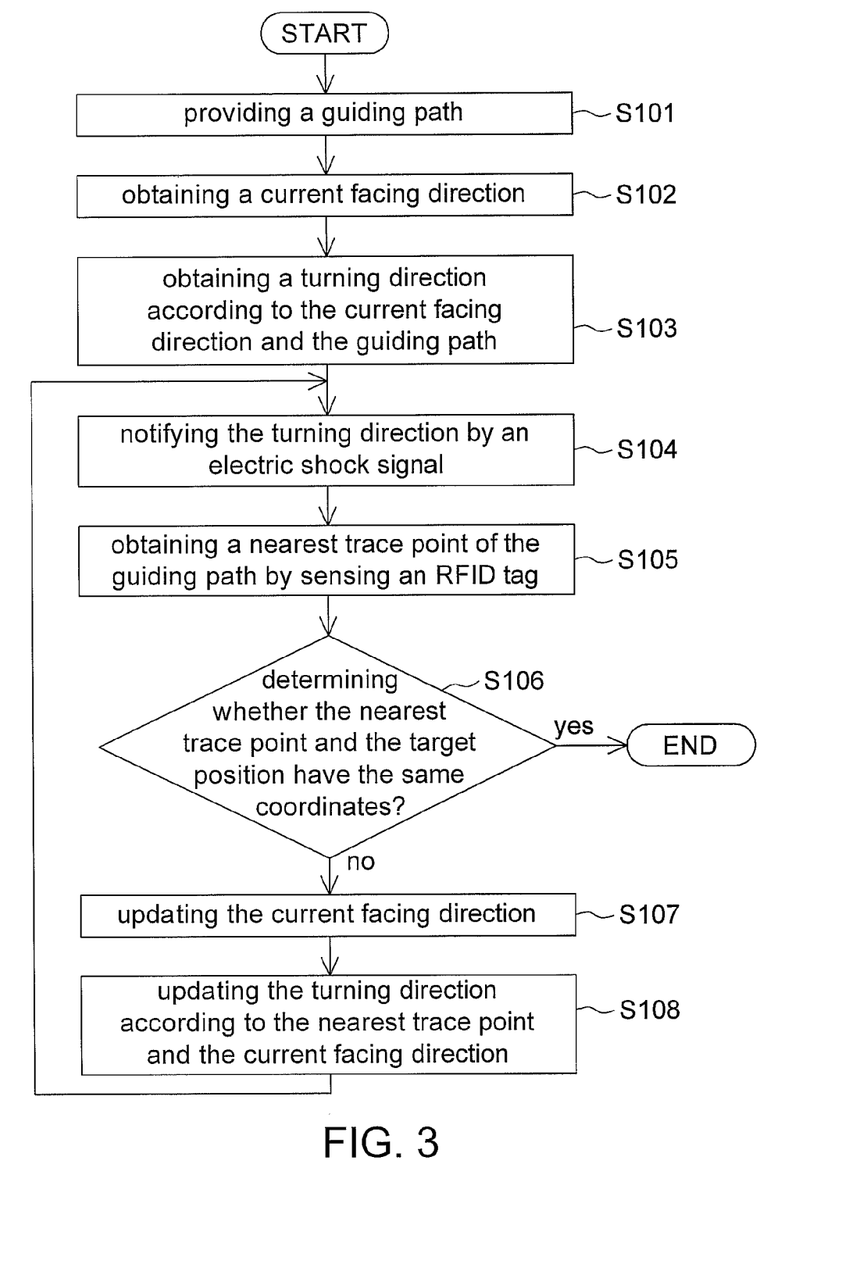
FIG. 3 is an exemplary embodiment of a flowchart of an automatic navigation method of the first embodiment.
Figure 4:
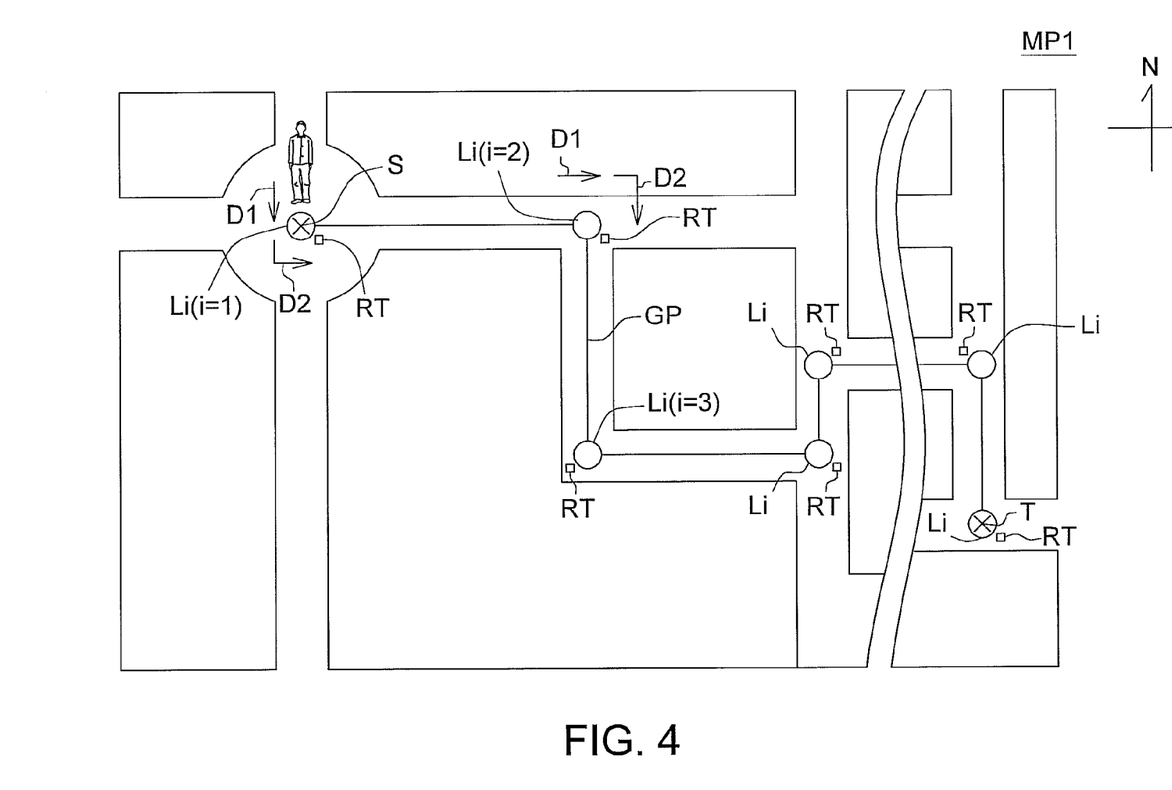
FIG. 4 is an exemplary embodiment of a map information.

Referring to FIGS. 3 and 4. FIG. 3 is an exemplary embodiment of a flowchart of an automatic navigation method of the first embodiment. FIG. 4 is an exemplary embodiment of a map information MP1. The automatic navigation method of the present embodiment is exemplified by the automatic navigation system 100 of FIG. 1 and the map information MP1 of FIG. 4 below. However, anyone who is skilled in the technology of the disclosure will understand that the automatic navigation method of the present embodiment is not limited to being used in the automatic navigation system 100 of FIG. 1 and the map information MP1 of FIG. 4, and the sequence of the steps is not limited to that illustrated in FIG. 3.

In the step S101, the guiding path GP is provided by the path planning unit 120. In the present step, the map information MP1, the initial position S and the target position T are provided by the providing unit 110 first, and the guiding path GP is planned by the path planning unit 120 according to the map information MP1, the initial position S and the target position T.

In an embodiment, the providing unit 110 provides various choices for the user to obtain the initial position S and the target position T. That is, the user can obtain the initial position S and the target position T by clicking the screen or by pressing the key. In another embodiment, the providing unit 110 further provides audio broadcasting for the user to confirm to obtain the initial position S and the target position T by way of clicking the screen or pressing the key.

In another embodiment, the providing unit 110 can obtain the initial position S by sensing the power pole near the user or the radio-frequency identification (RFID) tag RT embedded in the wall of nearby shops with the sensing unit 160.

The way of using audio broadcasting or using RFID tag RT is applicable to those with visual disabled.

In the step S102, the current facing direction D1 which the user faces is obtained by an electronic compass 130. As indicated in FIG. 4, the current facing direction D1 which the user standing at the initial position S is south.

In the step S103, the turning direction D2 is obtained by the processing unit 140 according to the current facing direction D1 and the guiding path GP. As indicated in FIG. 4, the nearest trace point Li (i=1) of the guiding path GP and the initial position S have the same coordinates. Meanwhile, the current facing direction D1 of the user is south, and the direction to enter the guiding path GP is east, so the turning direction D2 of user is directed towards left turn.

Figure 5:
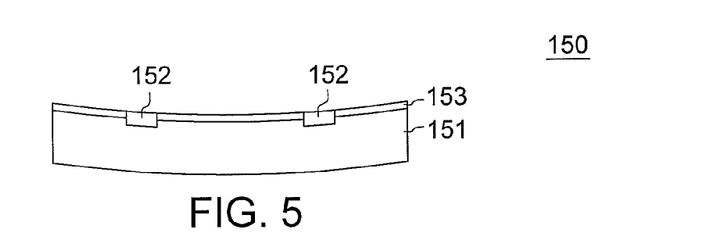
FIG. 5 is an exemplary embodiment of an electric shock unit.
Figure 6:
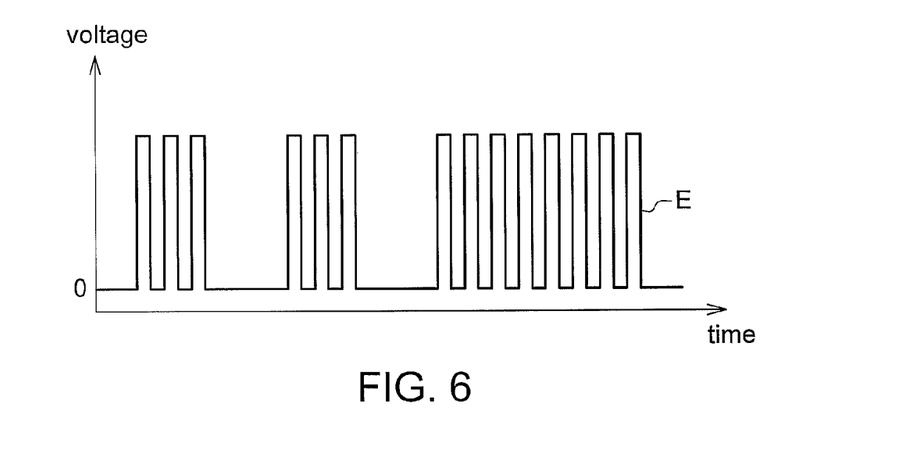
FIG. 6 is an exemplary embodiment of a wave-pattern diagram of an electrode signal.

In the step S104, the electric shock unit 150 notifies the turning direction D2 by the electric shock signal E (shown in FIG. 1). Referring to FIG. 5, the electric shock unit 150 is shown. The electric shock unit 150 includes a flexible substrate 151, two electrode plates 152 and a viscous film 153. The electrode plates 152 are embedded in the flexible substrate 151. The viscous film 153 is disposed on the surface of the flexible substrate 151. The flexible substrate 151 is soft and can be deformed along the surface of the skin. The viscous film 153 facilitates the flexible substrate 151 to be adhered onto the skin. The electrode plate 152 is exposed on the surface of the flexible substrate 151 to touch the skin. The electric shock signal E (shown in FIG. 1) is applied to the user's skin through the electrode plates 152. The user may feel slight vibrations when receiving the electric shock signal E. In an embodiment, the turning direction can be denoted by the duration of the electric shock signal E. Referring to FIG. 6, a wave-pattern diagram of the electrode signal E is shown. When the turning direction D2 (shown in FIG. 4) is directed towards left turn, the electric shock signal E can indicate such left turn by providing continuous two short-duration signals and one long-duration signal. In another embodiment, when the turning direction D2 is directed towards right turn, the electric shock signal E can indicated such right turn by providing continuous one short-duration signal and two long-duration signals.

Figure 7:
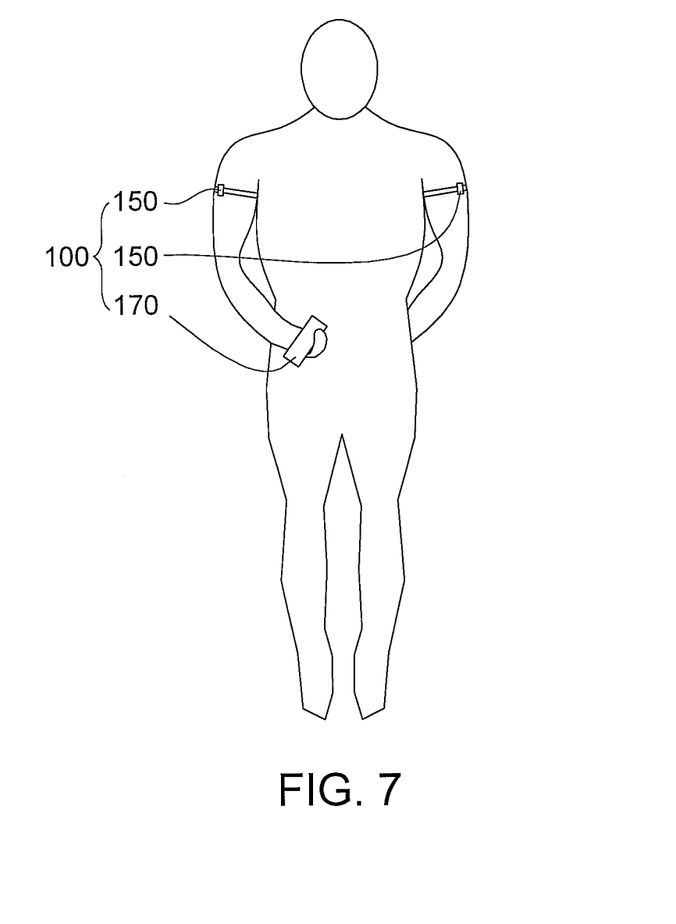
FIG. 7 is an exemplary embodiment of another way of disposition of the electric shock unit of an automatic navigation system.

Referring to FIG. 7, another way of disposition of the electric shock unit 150 of the automatic navigation system 100 is shown. As indicated in FIG. 7, the electric shock unit 150 can be disposed on the user's left limb and right limb (such as left hand and right hand; or left foot and right foot). When the turning direction D2 is directed towards left turn, the electric shock unit 150 disposed on the left limb applies the electrode signal E. When the turning direction D2 is directed towards right turn, the electric shock unit 150 disposed on the right limb applies the electric shock signal E. Thus, the user can intuitively understand the guidance of the turning direction D2.

In the step S105, the nearest trace point Li (i=1, 2, 3 . . . ) of the guiding path GP is obtained by sensing the radio-frequency identification (RFID) tag RT. As indicated in FIG. 4, when the user walks along the guiding path GP, the sensing unit 160 can sense the RFID tag RT embedded at the nearest trace point Li (i=1, 2, 3 . . . ).

In the step S106, whether the nearest trace point Li (i=1, 2, 3 . . . ) and the target position T have the same coordinates is determined by the processing unit 140. If the nearest trace point Li (i=1, 2, 3 . . . ) and the target position T have the same coordinates, then the method terminates. If the nearest trace point Li (i=1, 2, 3 . . . ) and the target position T do not have the same coordinates, then the method proceeds to the step S107.

In the step S107, the current facing direction D1 is updated. In the present step, the processing unit 140 updates the current facing direction D1 which the user faces by the electronic compass 130. Or, the processing unit 140 can update the current facing direction D1 according to the currently obtained nearest trace point Li (i=2, 3 . . . ) and the previously obtained nearest trace point Li (i=1, 2, 3 . . . ). That is to say, the current facing direction D1 can be updated according to the extending direction of the two nearest trace points Li (i=1, 2, 3) which the user just walked through.

In the step S108, the turning direction D2 is updated by the processing unit 140 according to the nearest trace point Li (i=1, 2, 3 . . . ) and the current facing direction D1. Let the nearest trace point Li (i=2) located to the right of the trace point Li (i=1) of FIG. 4 be taken for example. The current facing direction D1 which the user faces is east, and the subsequent the guiding path GP is directed towards south, so the turning direction D2 will be updated to be directed towards right turn.

Then, the steps S104-S108 are repeated until the determination of step S106 indicates that the nearest trace point Li (i=1, 2, 3 . . . ) and the target position T have the same coordinates, and the method terminates.

Second Embodiment

Figure 8:
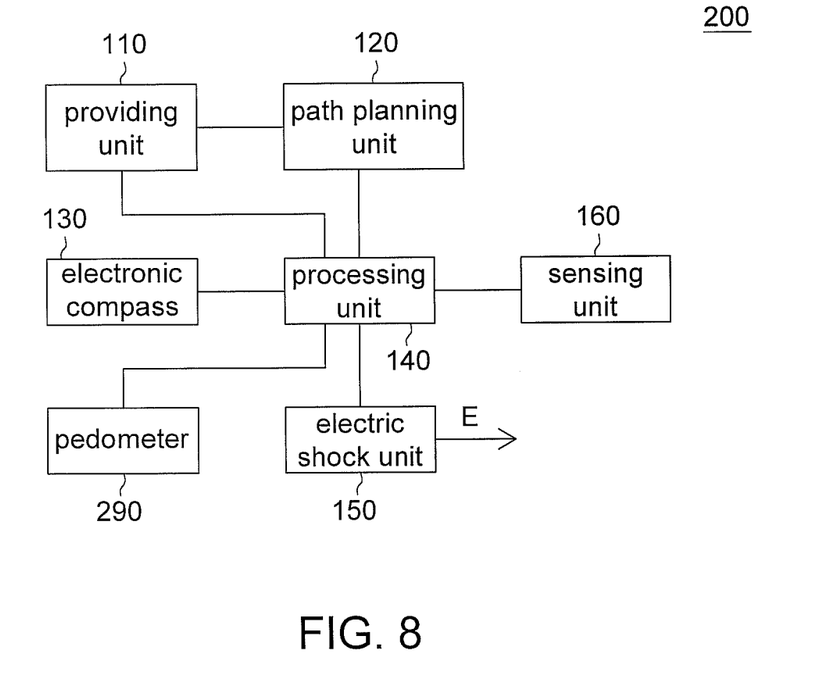
FIG. 8 is an exemplary embodiment of a block diagram of an automatic navigation system of the second embodiment.
Figure 9:
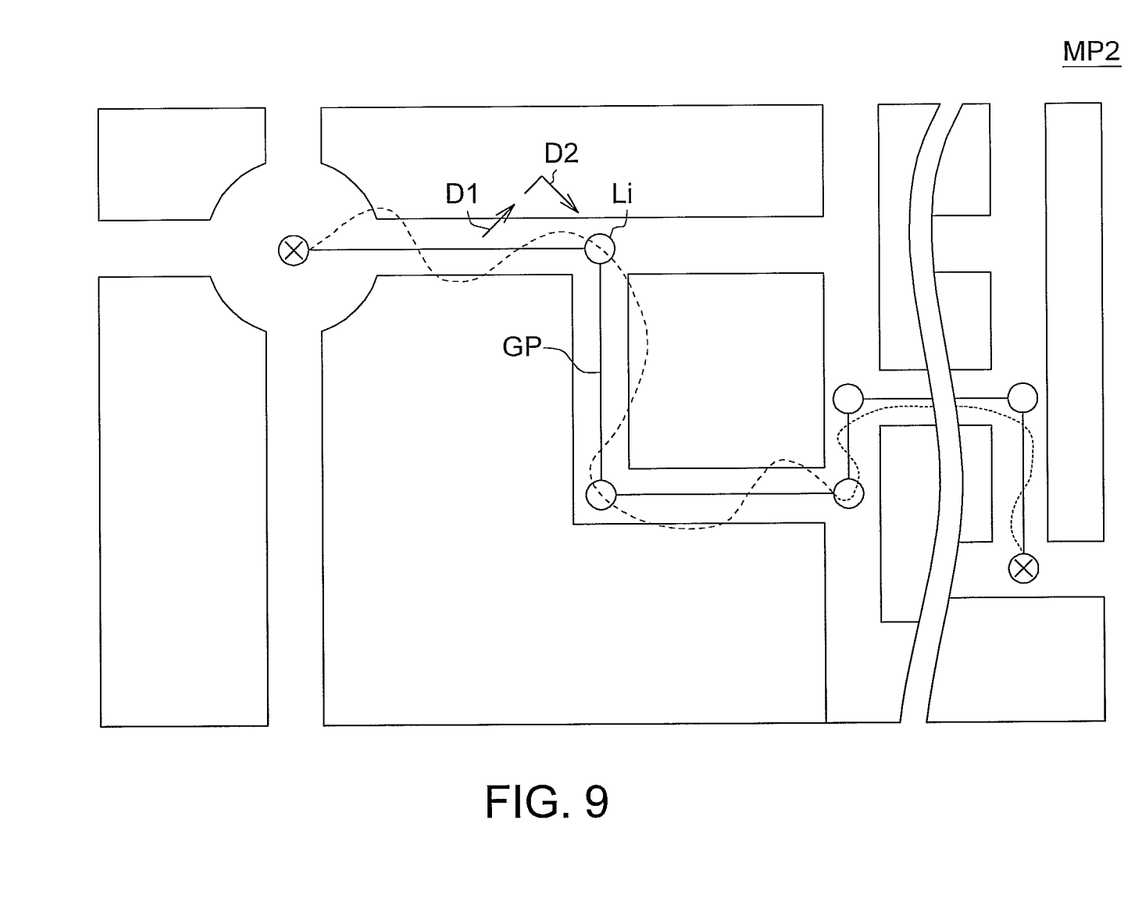
FIG. 9 is an exemplary embodiment of a map information.

Referring to FIGS. 8 and 9. FIG. 8 is an exemplary embodiment of a block diagram of an automatic navigation system 200 of the second embodiment. FIG. 9 is an exemplary embodiment of a map information MP2. The automatic navigation system 200 of the present embodiment is different from the automatic navigation system 100 of the first embodiment in that the automatic navigation system 200 of the present embodiment further includes a pedometer 290, and other similarities are not repeated.

As indicated in FIG. 9, when the automatic navigation system 200 is used by a user with visual disabled, the user's actual route is indicated in dotted lines and is hard to catch.

The user may deviate from the guiding path GP and cannot reach the next trace point Li (i=2, 3 . . . ). Thus, when the user is walking, the processing unit 140 can estimate whether the user deviates from the guiding path GP according to the step count calculated by the pedometer 290 and the current facing direction D1 measured by the electronic compass 130. When the user is off the guiding path GP, the processing unit 130 updates the turning direction D2, and immediately controls the electric shock unit 150 to send the electrode signal E to remind the user to change the direction and return to the original guiding path GP. In an embodiment, the providing unit 110 can provide a reasonable step count from the nearest trace point Li (i=1, 2, 3 . . . ) to the next trace point Li (i=2, 3 . . . ). Suppose the user's actual rout is indicated in dotted lines. According to the step count calculated by the pedometer 290, which exceeds the reasonable step count by a predetermined threshold, and the current facing direction D1 measured by the electronic compass 130, the processing unit 140 determines that the user already deviates from the guiding path GP. Then, the processing unit 140 immediately updates the turning direction D2, and controls the electric shock unit 150 to emit the electrode signal E to remind the user of the turning direction D2 for guiding the user to return to the original guiding path GP.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic navigation method, comprising:
   providing a guiding path;
   obtaining a current facing direction which a user faces by an electronic compass;
   obtaining a turning direction according to the current facing direction and the guiding path;
   notifying the turning direction by an electric shock signal;
   obtaining a nearest trace point of the guiding path by sensing a radio-frequency identification (RFID) tag; and
   updating the turning direction according to the nearest trace point and the current facing direction;
   wherein the electric shock signal is directed towards left turn or right turn by providing a combination of at least one short-duration signal and at least one long-duration signal.

2. The automatic navigation method according to claim 1, further comprising:
   updating the current facing direction by the electronic compass.

3. The automatic navigation method according to claim 1, further comprising:
   updating the current facing direction according to the currently obtained nearest trace point and the previously obtained nearest trace point.

4. The automatic navigation method according to claim 1, wherein the step of obtaining the nearest trace point and the step of updating the turning direction are repeatedly performed.

5. The automatic navigation method according to claim 1, wherein the step of providing the guiding path comprises:
   providing a map information, an initial position and a target position; and
   planning the guiding path according to the map information, the initial position and the target position.

6. The automatic navigation method according to claim 5, further comprising:
   obtaining the initial position by sensing the radio-frequency identification (RFID) tag.

7. The automatic navigation method according to claim 1, wherein in the step of notifying the turning direction by the electric shock signal, the electric shock signal is applied to a user's skin.

8. The automatic navigation method according to claim 1, wherein in the step of notifying the turning direction by the electric shock signal, the electric shock signal is applied to a user' left limb or right limb.

9. An automatic navigation system, comprising:
   a path planning unit used for providing a guiding path;
   an electronic compass used for obtaining a current facing direction which a user faces;
   a processing unit used for obtaining a turning direction according to the current facing direction and the guiding path;
   an electric shock unit used for emitting an electric shock signal to notify the user the turning direction; and
   a sensing unit used for sensing a radio-frequency identification (RFID) tag to obtain a nearest trace point of the guiding path, wherein the processing unit further updates the turning direction according to the nearest trace point and the current facing direction;
   wherein the electric shock signal is directed towards left turn or right turn by providing a combination of at least one short-duration signal and at least one long-duration signal.

10. The automatic navigation system according to claim 9, wherein the electronic compass further updates the current facing direction.

11. The automatic navigation system according to claim 9, wherein the processing unit updates the current facing direction according to the currently obtained nearest trace point and the previously obtained nearest trace point.

12. The automatic navigation system according to claim 9, further comprising:
   a providing unit used for providing a map information, an initial position and a target position, wherein the path planning unit plans the guiding path according to the map information, the initial position and the target position.

13. The automatic navigation system according to claim 12, wherein the providing unit obtains the initial position according to the RFID tag.

14. The automatic navigation system according to claim 9, wherein the electric shock unit is disposed on a user's skin.

15. The automatic navigation system according to claim 9, wherein the electric shock unit is disposed on a user's left limb and right limb.

* * * * *